United States Patent
Inoue

(10) Patent No.: US 9,696,529 B2
(45) Date of Patent: Jul. 4, 2017

(54) ZOOM LENS AND IMAGE PICKUP APPARATUS INCLUDING THE SAME

(71) Applicant: CANON KABUSHIKI KAISHA, Tokyo (JP)

(72) Inventor: Suguru Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/194,964

(22) Filed: Jun. 28, 2016

(65) Prior Publication Data

US 2017/0003486 A1    Jan. 5, 2017

(30) Foreign Application Priority Data

Jul. 1, 2015    (JP) .................................. 2015-132590

(51) Int. Cl.
| | |
|---|---|
| *G02B 15/14* | (2006.01) |
| *G02B 15/20* | (2006.01) |
| *G02B 7/105* | (2006.01) |
| *G02B 9/62* | (2006.01) |
| *G02B 27/00* | (2006.01) |
| *G02B 9/60* | (2006.01) |

(52) U.S. Cl.
CPC ............. *G02B 15/20* (2013.01); *G02B 7/105* (2013.01); *G02B 9/60* (2013.01); *G02B 9/62* (2013.01); *G02B 27/0025* (2013.01)

(58) Field of Classification Search
CPC ....................................................... G02B 15/20
USPC ........................................................... 359/684
See application file for complete search history.

(56) References Cited

U.S. PATENT DOCUMENTS

| | | |
|---|---|---|
| 8,537,471 B2 | 9/2013 | Uchida et al. |
| 2015/0253551 A1* | 9/2015 | Obama ................ G02B 15/173 359/557 |

FOREIGN PATENT DOCUMENTS

| | | |
|---|---|---|
| JP | H1039215 A | 2/1998 |
| JP | 2009168934 A | 7/2009 |
| JP | 2012053444 A | 3/2012 |

* cited by examiner

*Primary Examiner* — James Jones
(74) *Attorney, Agent, or Firm* — Rossi, Kimms & McDowell LLP

(57) ABSTRACT

A zoom lens includes, in order from an object side to an image side: a first lens unit having a positive refractive power; a second lens unit having a negative refractive power; a third lens unit having a positive refractive power; a fourth lens unit having a positive refractive power; and a fifth lens unit having a negative refractive power, in which: at a telephoto end as compared to a wide angle end, an interval between first lens unit and second lens unit is increased, and an interval between second lens unit and third lens unit is decreased; an interval between each pair of adjacent lens units is changed during zooming; and focal lengths of a focusing mechanism and the third lens unit, a movement amount of the fifth lens unit during zooming from the wide angle end to the telephoto end, and other factors are appropriately set.

16 Claims, 13 Drawing Sheets

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitable for an image pickup apparatus using a solid-state image pickup element, e.g., a video camera, an electronic still camera, a broadcasting camera, or a monitoring camera.

Description of the Related Art

There has been known an image pickup system including a camera main body, which includes a solid-state image pickup element, such as a charge-coupled device (CCD) or a complementary metal oxide semiconductor (CMOS), and an interchangeable lens apparatus, which includes an image pickup optical system configured to form an optical image on an image pickup sensor surface. The image pickup optical system used in the interchangeable lens apparatus is required to be a compact zoom lens having a high zoom ratio and high optical characteristics over the entire zoom range.

Moreover, such image pickup system as described above is required to be able to execute not only still image shooting but also moving image shooting. In the moving image shooting, a focusing operation, which is executed during the still image shooting, needs to be performed repeatedly. Here, during the moving image shooting, it is a common practice to use a method of detecting a direction of shift from an in-focus state by driving a focus unit to reciprocate in an optical axis direction. The operation of driving the focus unit to reciprocate in the optical axis direction is referred to as "wobbling". In this method, during the wobbling, signal components in a particular frequency band of an image region are detected from output signals, which are obtained by an image pickup sensor, to calculate a position of the focus unit in the optical axis direction at which the in-focus state is achieved.

In the focusing operation during the moving image shooting, in order not to make a user feel a sense of discomfort, such as flickering, the focus unit needs to be driven at high speed when the focus unit is driven to wobble. When the focusing operation is performed by the wobbling, and when a weight of the focus unit is heavy, an actuator is increased in size in order to drive the focus unit at high speed. As a result, the maximum diameter of a lens barrel is increased, and the interchangeable lens apparatus is increased in size.

In order to achieve an increase in speed of the focusing operation, there has been known a telephoto-type zoom lens, which is configured to drive a lens unit arranged on an image side of an aperture stop to wobble, to thereby perform the focusing operation. In Japanese Patent Application Laid-Open No. H10-39215 and Japanese Patent Application Laid-Open No. 2009-168934, there is disclosed a zoom lens including, in order from an object side to an image side, first to fifth lens units having positive, negative, positive, positive, and negative refractive powers, in which the fifth lens unit, which is relatively compact and lightweight, is configured to function as a focus unit.

In Japanese Patent Application Laid-Open No. 2012-53444, there is disclosed a zoom lens including, in order from an object side to an image side, first to sixth lens units having positive, negative, positive, positive, positive, and negative refractive powers, in which the fifth lens unit or the sixth lens unit is configured to function as a focus unit.

In a telephoto-type zoom lens, in order to perform high-speed focusing while achieving the high zoom ratio and downsizing of the entire lens system, it is important to appropriately set a zoom type, refractive powers of respective lens units, a lens configuration, and other such factors.

SUMMARY OF THE INVENTION

According to one embodiment of the present invention, there is provided a zoom lens, including, in order from an object side to an image side:
a first lens unit having a positive refractive power;
a second lens unit having a negative refractive power;
a third lens unit having a positive refractive power;
a fourth lens unit having a positive refractive power; and
a fifth lens unit having a negative refractive power,
in which at a telephoto end as compared to a wide angle end, an interval between the first lens unit and the second lens unit is increased, and an interval between the second lens unit and the third lens unit is decreased,
in which an interval between each pair of adjacent lens units is changed during zooming,
in which the fifth lens unit is configured to move in an optical axis direction during focusing, and
in which the following conditional expressions are satisfied:

$$0.4 < f3/fw < 1.0; \text{ and}$$

$$-1.0 < m5/fw < -0.5,$$

where fw represents a focal length of the zoom lens at the wide angle end, f3 represents a focal length of the third lens unit, and m5 represents a movement amount of the fifth lens unit during zooming from the wide angle end to the telephoto end.

Further features of the present invention will become apparent from the following description of exemplary embodiments with reference to the attached drawings.

DESCRIPTION OF THE EMBODIMENTS

Now, exemplary embodiments of the present invention are described with reference to the attached drawings. A zoom lens according to the present invention includes, in order from an object side to an image side, a first lens unit having a positive refractive power, a second lens unit having a negative refractive power, a third lens unit having a positive refractive power, a fourth lens unit having a positive refractive power, and a fifth lens unit having a negative refractive power. At a telephoto end as compared to a wide angle end, an interval between the first lens unit and the second lens unit is increased, and an interval between the second lens unit and the third lens unit is reduced. An interval between each pair of adjacent lens units is changed during zooming.

The fifth lens unit is configured to move in an optical axis direction during focusing. On the image side of the fifth lens unit, a sixth lens unit having a negative refractive power, which is configured not to move during zooming, may be provided.

Figure 1:
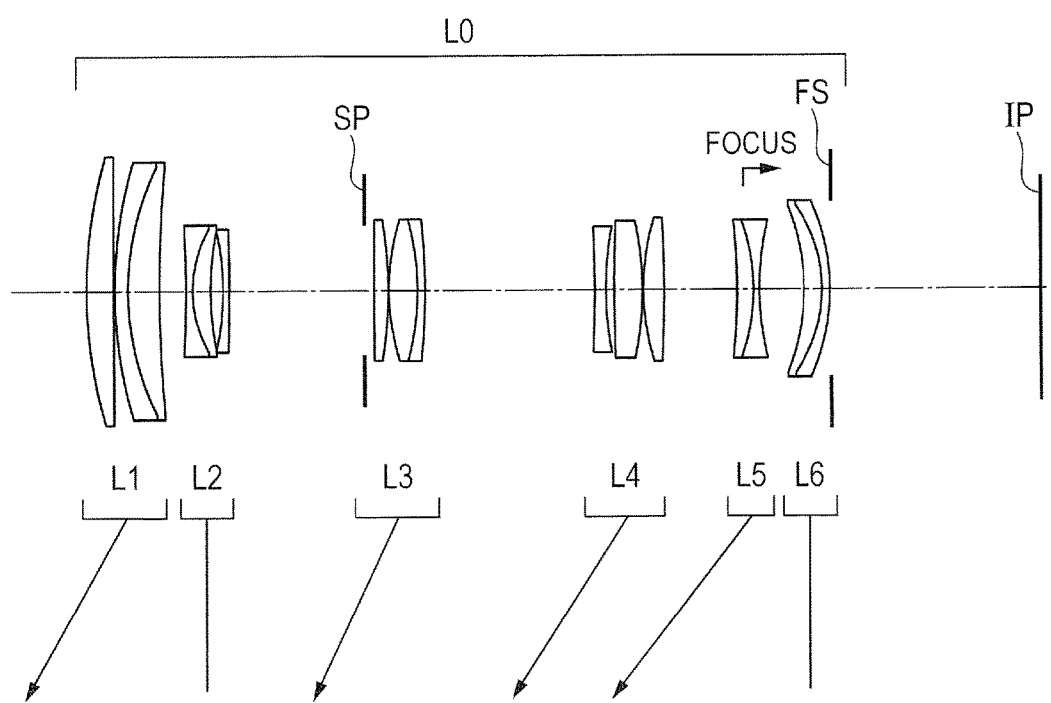
FIG. 1 is a lens cross-sectional view of the zoom lens according to Example 1 at a wide angle end.
Figure 2A:
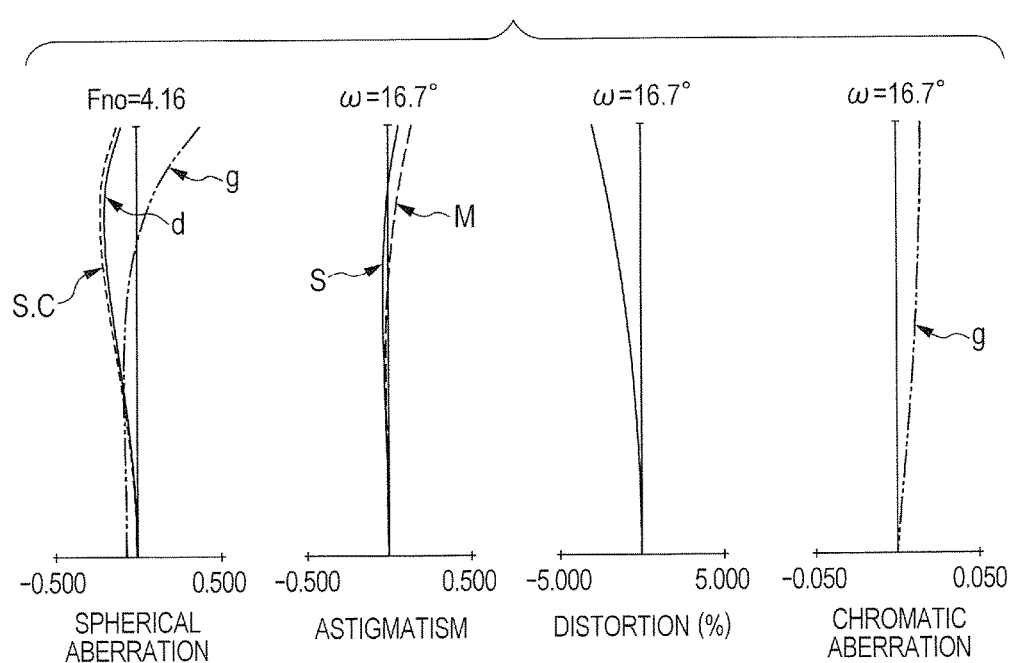
FIG. 2A is aberration diagrams of the zoom lens according to Example 1 at the wide angle end.
Figure 2B:
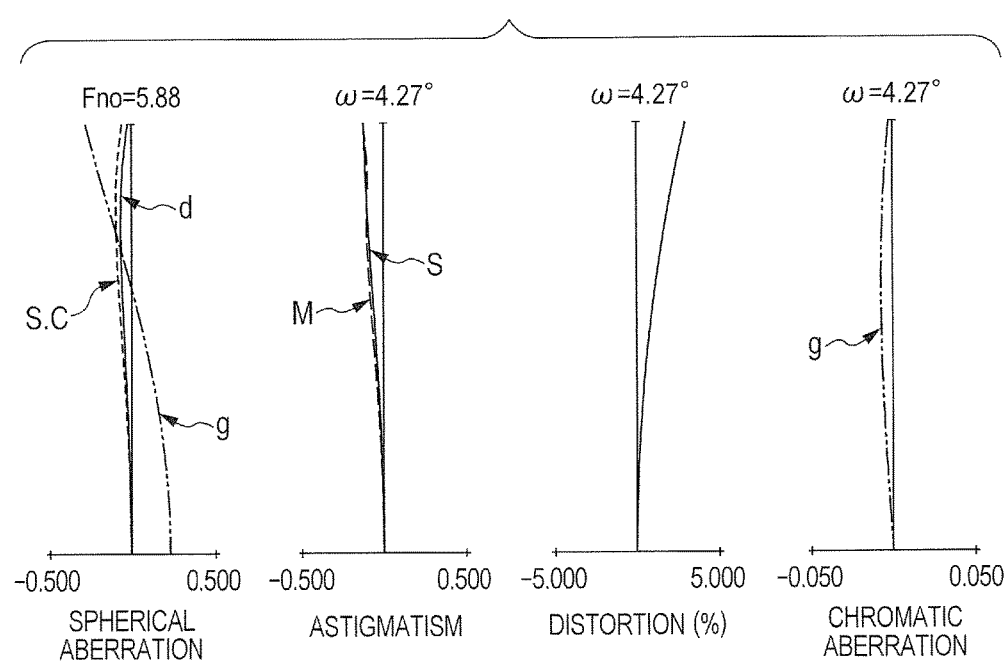
FIG. 2B is aberration diagrams of the zoom lens according to Example 1 at a telephoto end.
Figure 3:
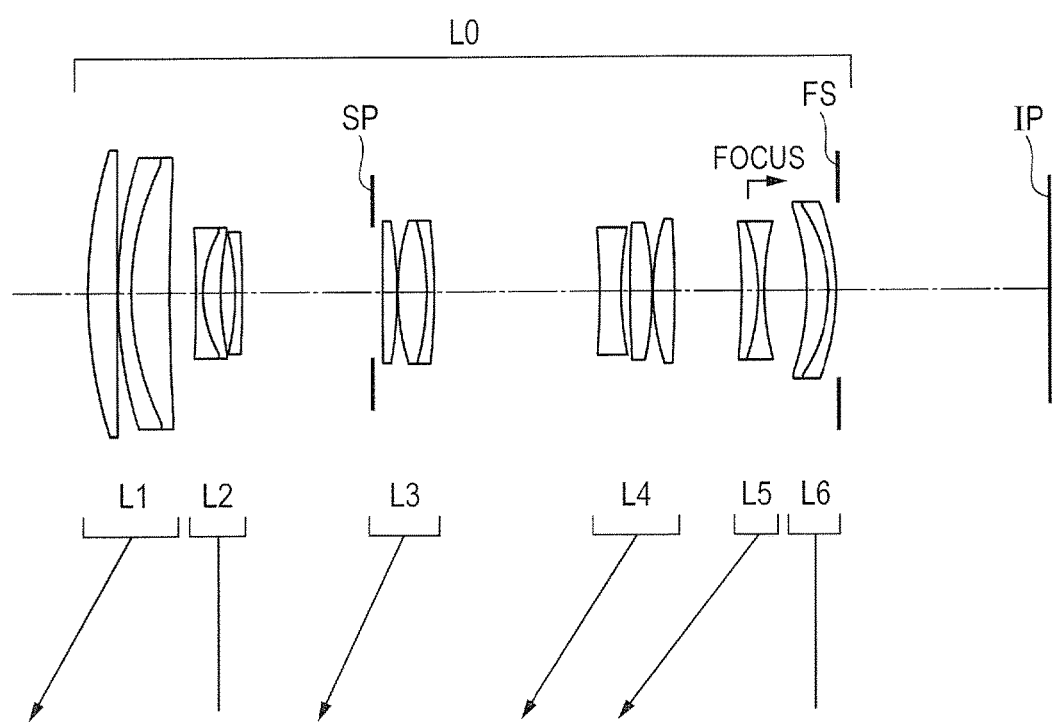
FIG. 3 is a lens cross-sectional view of the zoom lens according to Example 2 at a wide angle end.
Figure 4A:
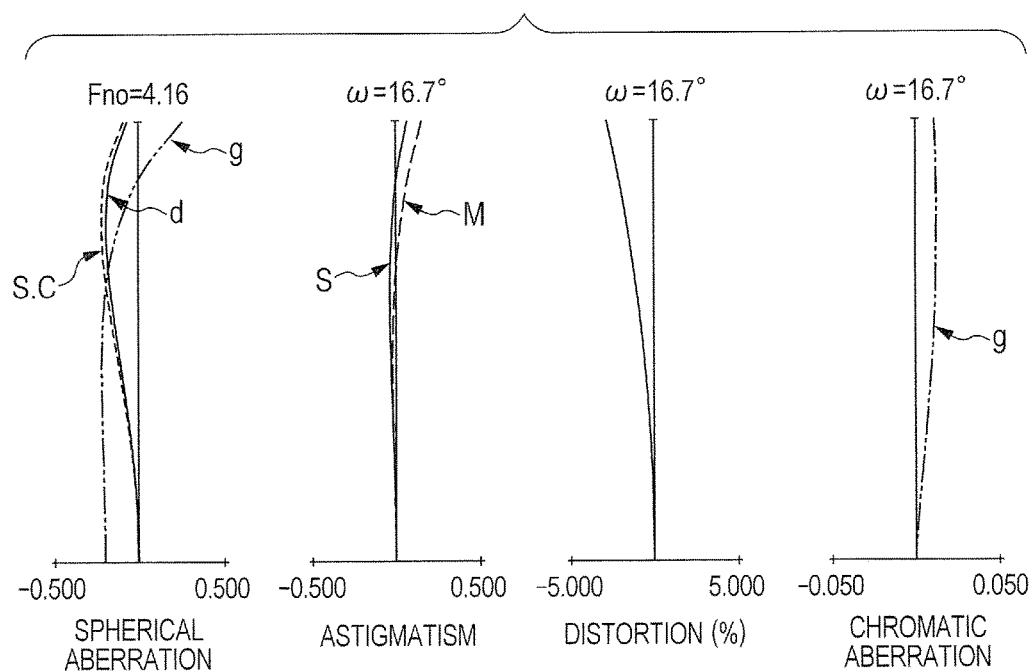
FIG. 4A is aberration diagrams of the zoom lens according to Example 2 at the wide angle end.
Figure 4B:
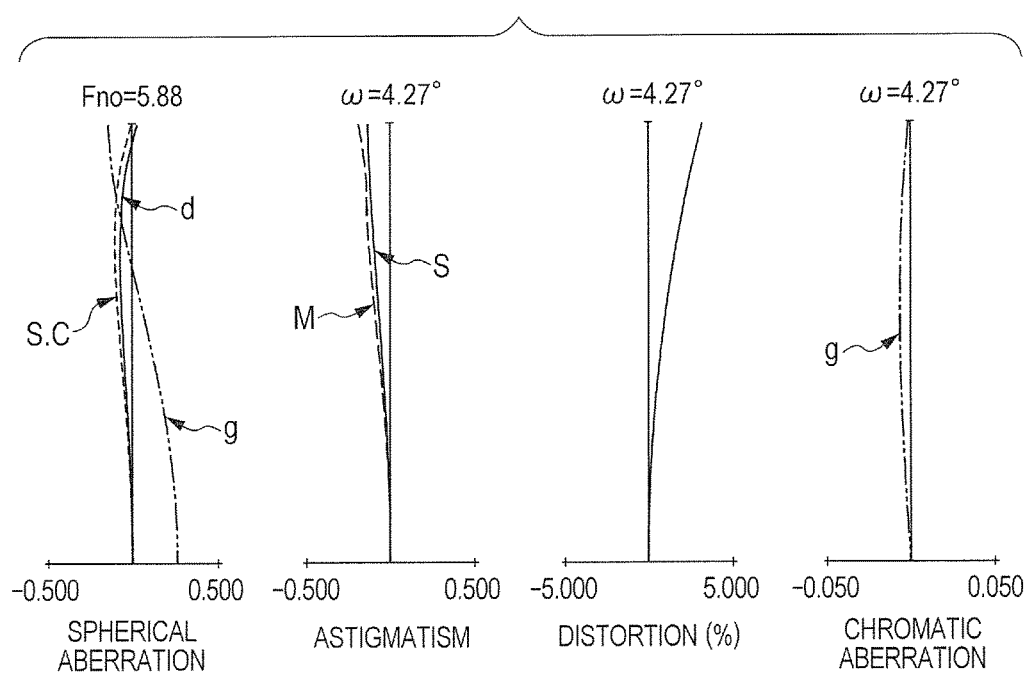
FIG. 4B is aberration diagrams of the zoom lens according to Example 2 at a telephoto end.

FIG. 1 is a lens cross-sectional view when focusing is made at infinity at a wide angle end (short focal length end) of a zoom lens of Example 1 of the present invention. FIG. 2A and FIG. 2B are longitudinal aberration diagrams when the focusing is made at the infinity at the wide angle end and when the focusing is made at the infinity at a telephoto end (long focal length end) of the zoom lens of Example 1. FIG. 3 is a lens cross-sectional view when the focusing is made at infinity at a wide angle end of a zoom lens of Example 2 of the present invention. FIG. 4A and FIG. 4B are longitudinal aberration diagrams when the focusing is made at the infinity at the wide angle end and when the focusing is made at the infinity at a telephoto end of the zoom lens of Example 2.

Figure 5:
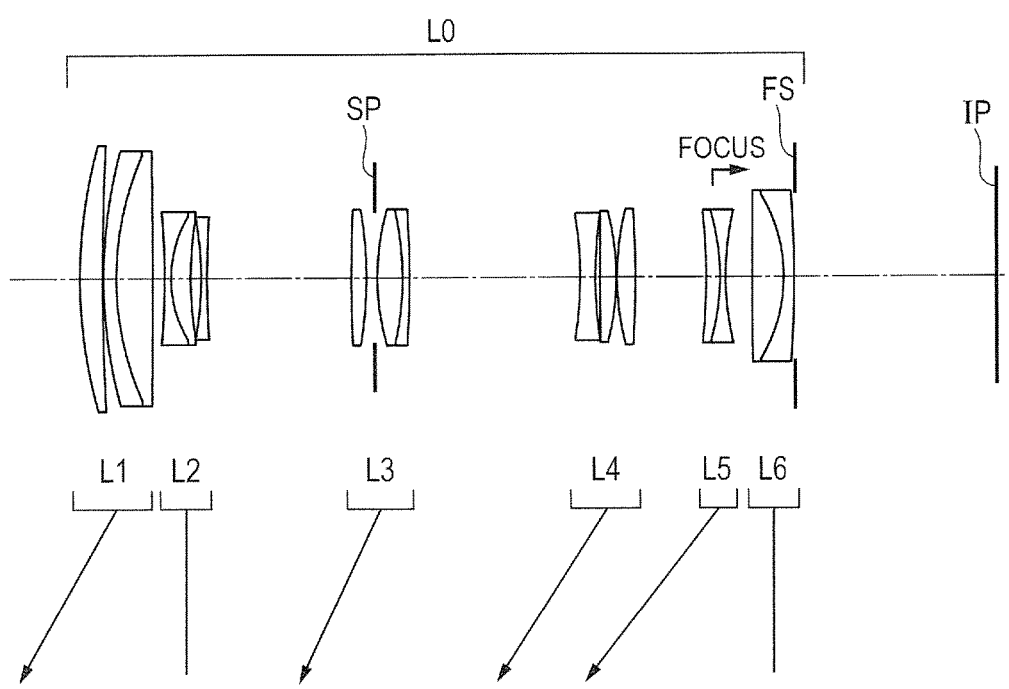
FIG. 5 is a lens cross-sectional view of the zoom lens according to Example 3 at a wide angle end.
Figure 6A:
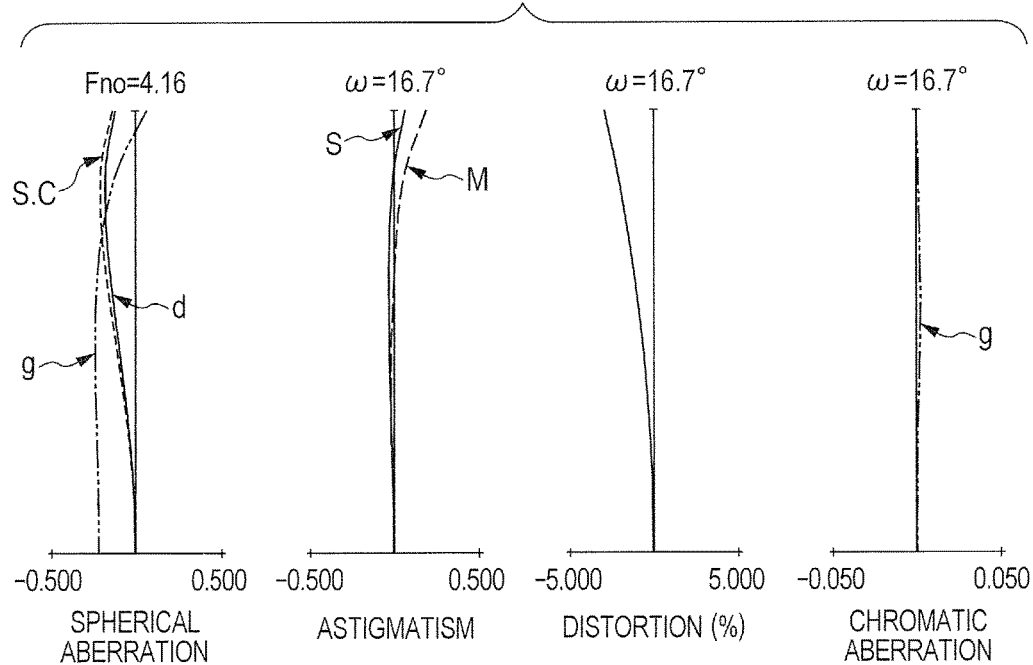
FIG. 6A is aberration diagrams of the zoom lens according to Example 3 at the wide angle end.
Figure 6B:
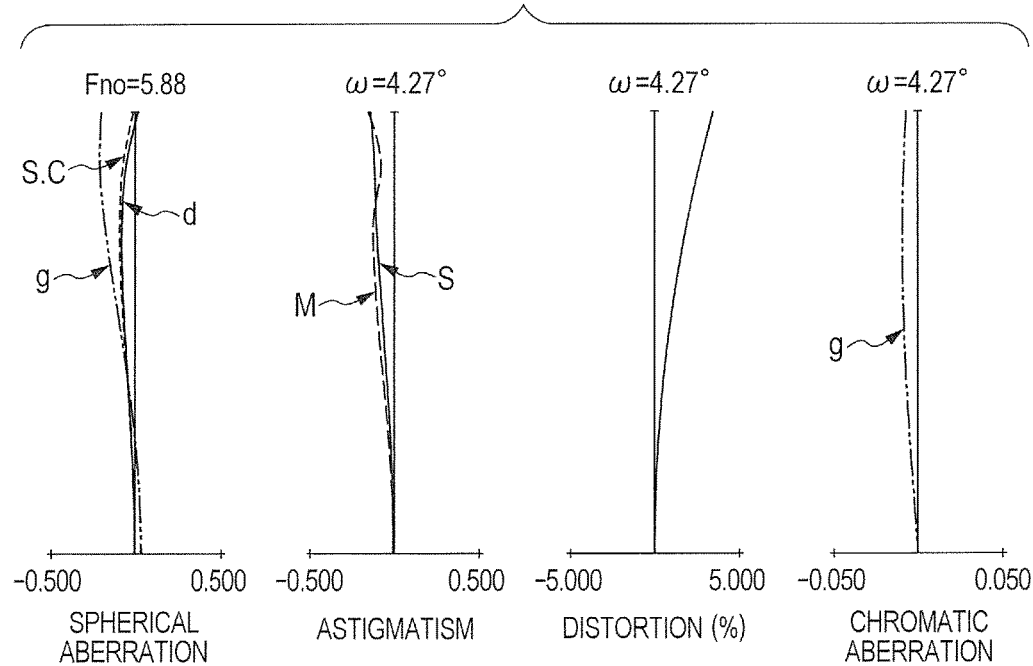
FIG. 6B is aberration diagrams of the zoom lens according to Example 3 at a telephoto end.
Figure 7:
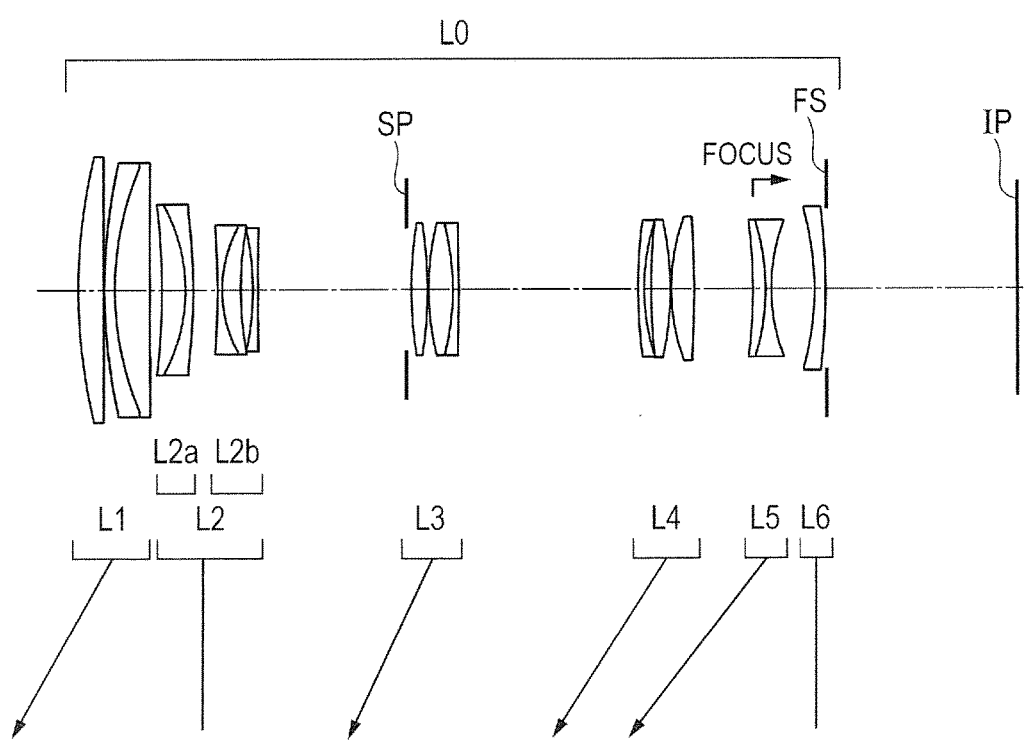
FIG. 7 is a lens cross-sectional view of the zoom lens according to Example 4 at a wide angle end.
Figure 8A:
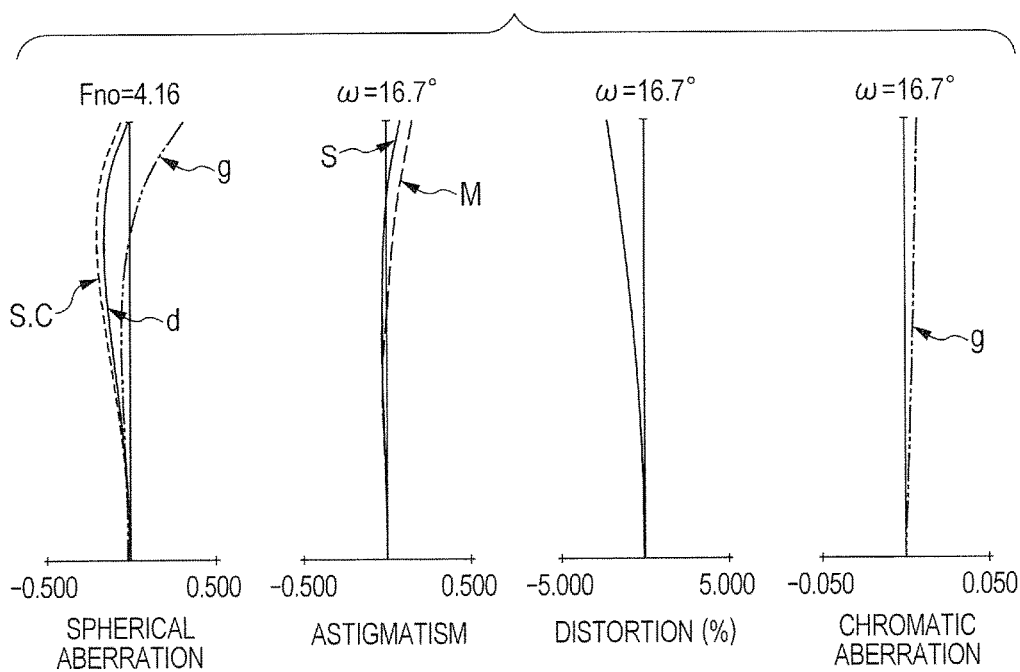
FIG. 8A is aberration diagrams of the zoom lens according to Example 4 at the wide angle end.
Figure 8B:
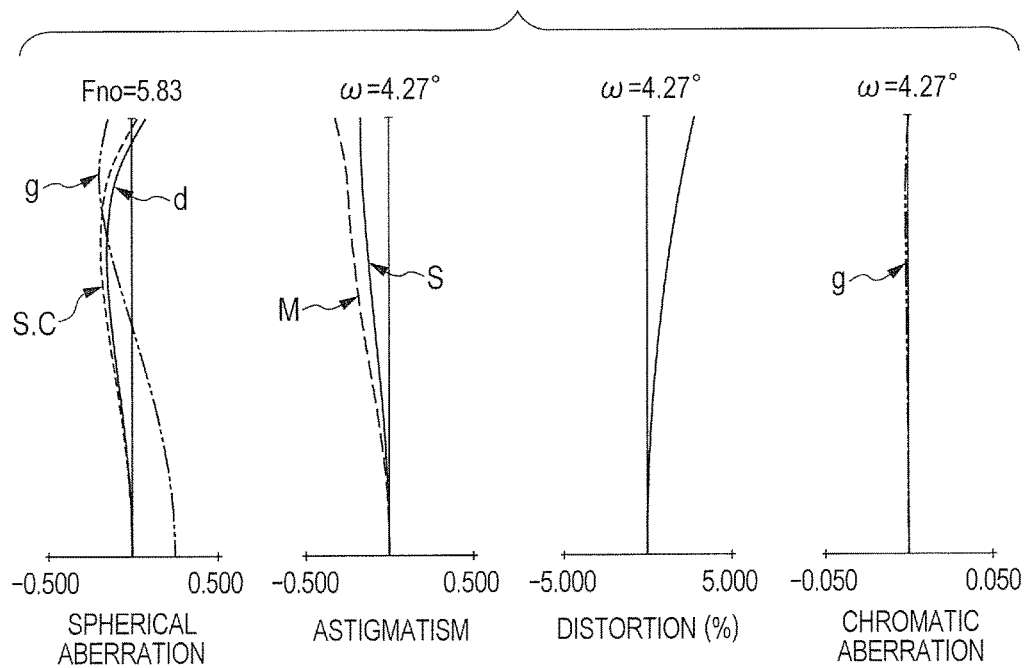
FIG. 8B is aberration diagrams of the zoom lens according to Example 4 at a telephoto end.

FIG. 5 is a lens cross-sectional view when the focusing is made at infinity at a wide angle end of a zoom lens of Example 3 of the present invention. FIG. 6A and FIG. 6B are longitudinal aberration diagrams when the focusing is made at the infinity at the wide angle end and when the focusing is made at the infinity at a telephoto end of the zoom lens of Example 3. FIG. 7 is a lens cross-sectional view when the focusing is made at infinity at a wide angle end of a zoom lens of Example 4 of the present invention. FIG. 8A and FIG. 8B are longitudinal aberration diagrams when the focusing is made at the infinity at the wide angle end and when the focusing is made at the infinity at a telephoto end of the zoom lens of Example 4.

Figure 9:
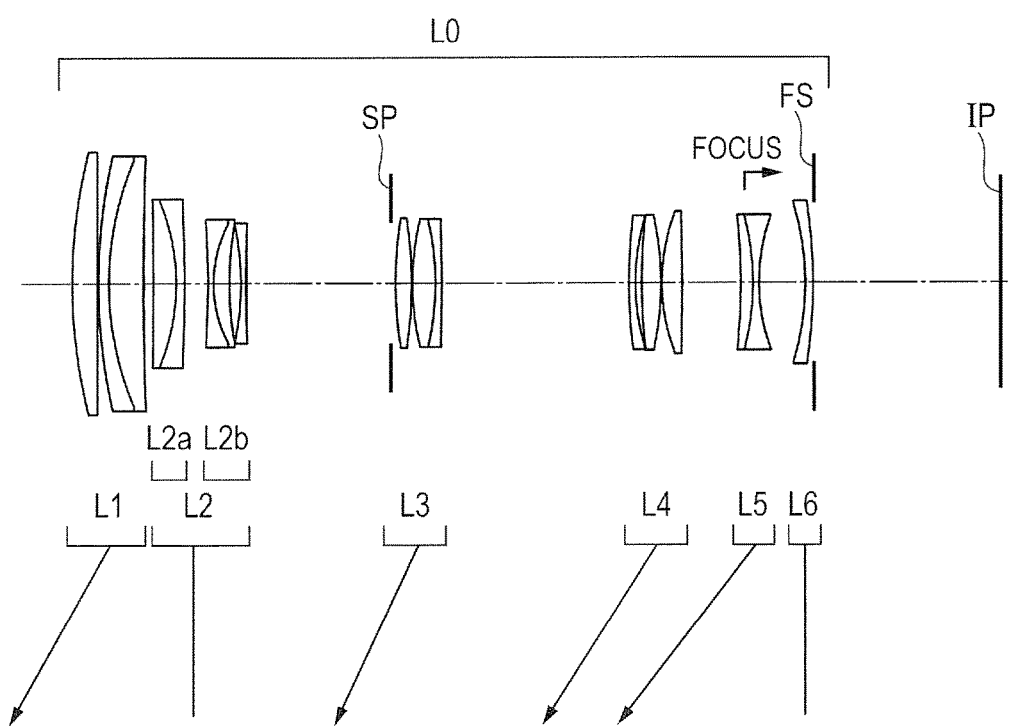
FIG. 9 is a lens cross-sectional view of the zoom lens according to Example 5 at a wide angle end.
Figure 10A:
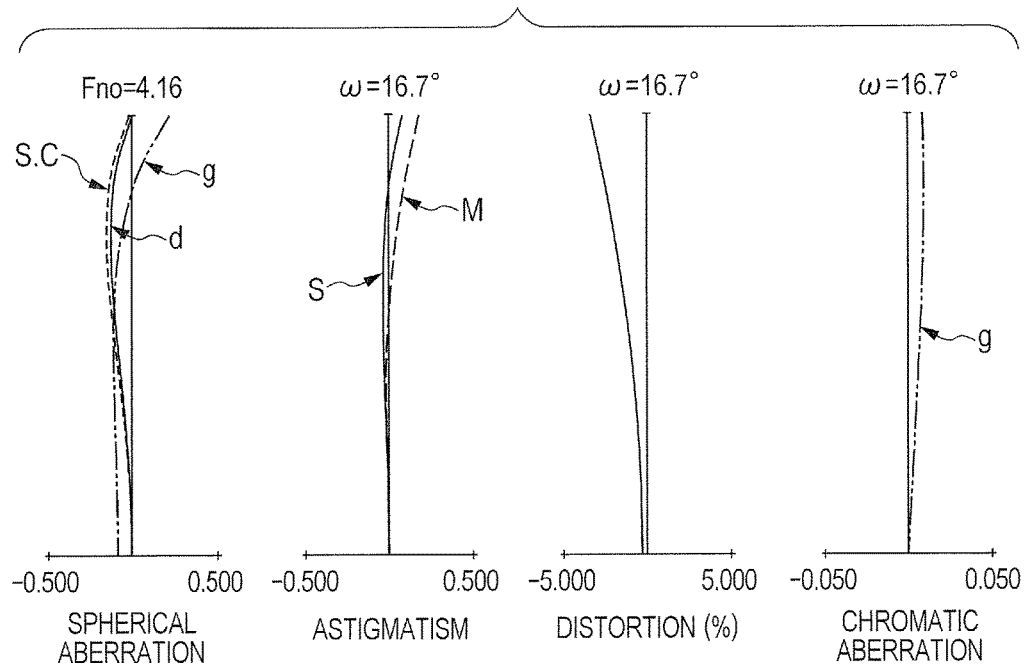
FIG. 10A is aberration diagrams of the zoom lens according to Example 5 at the wide angle end.
Figure 10B:
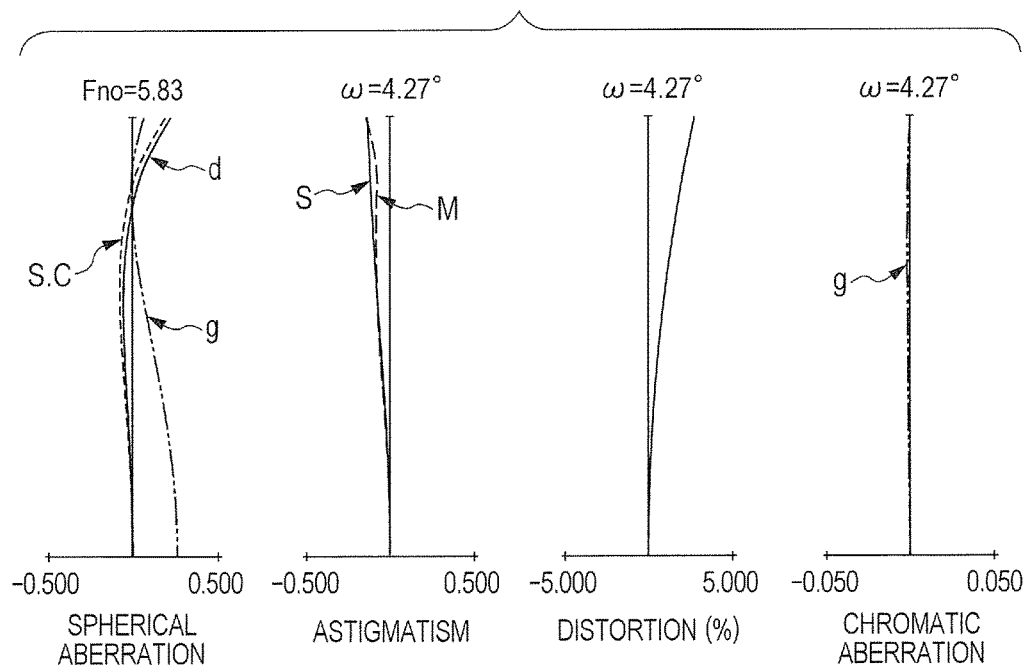
FIG. 10B is aberration diagrams of the zoom lens according to Example 5 at a telephoto end.
Figure 11:
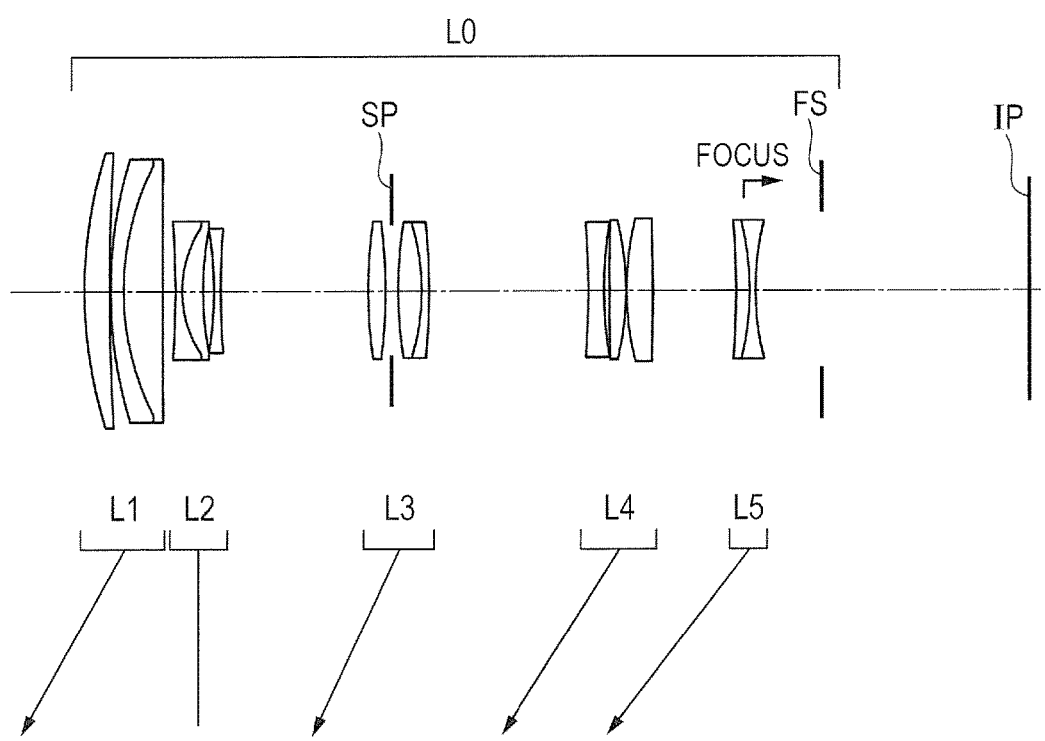
FIG. 11 is a lens cross-sectional view of the zoom lens according to Example 6 at a wide angle end.
Figure 12A:
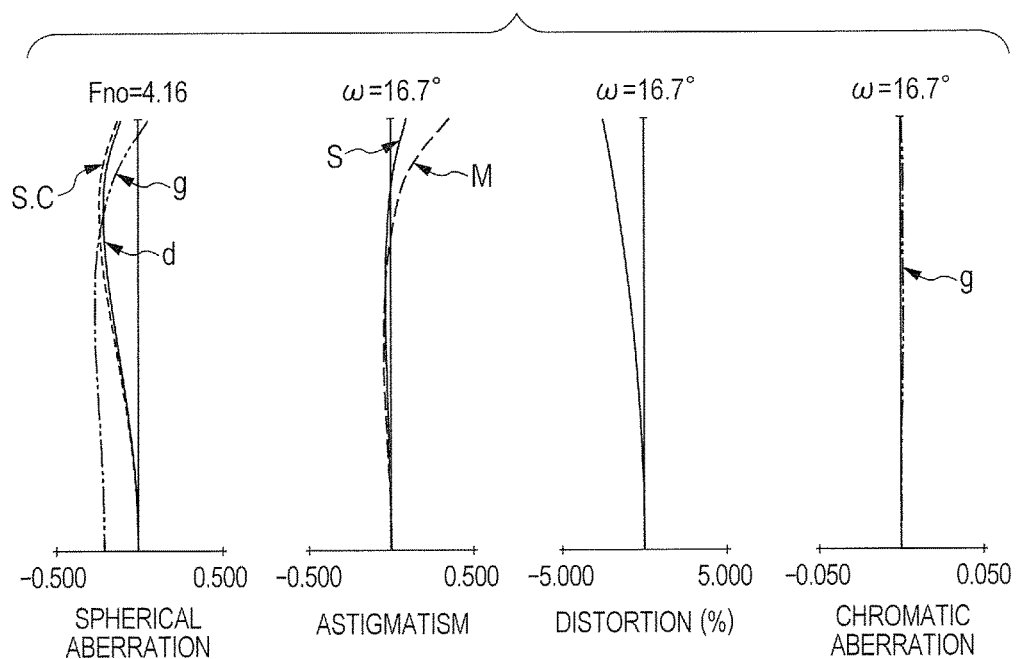
FIG. 12A is aberration diagrams of the zoom lens according to Example 6 at the wide angle end.
Figure 12B:
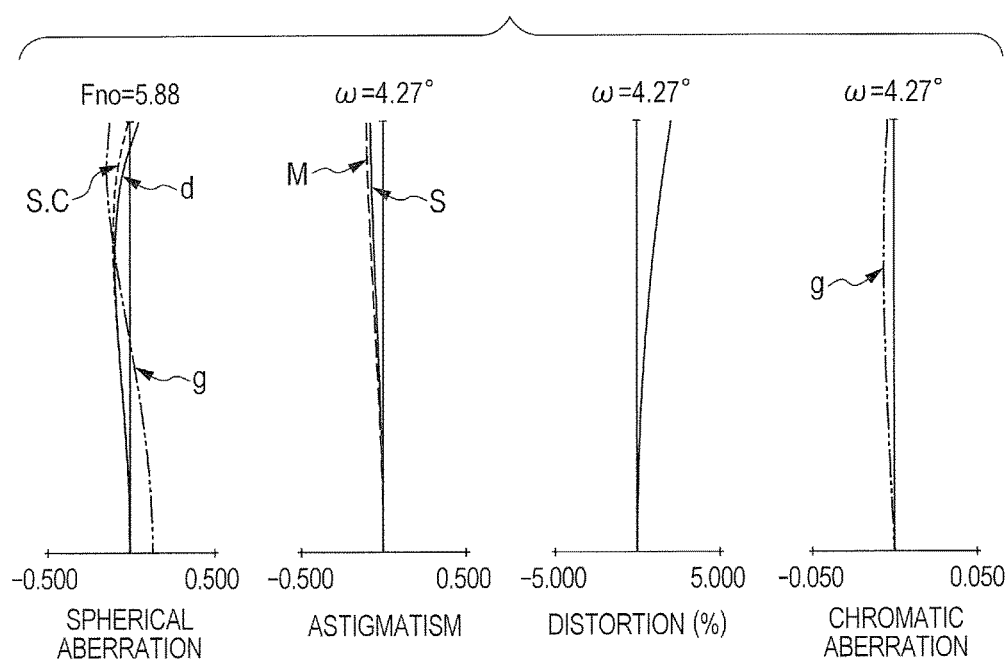
FIG. 12B is aberration diagrams of the zoom lens according to Example 6 at a telephoto end.

FIG. 9 is a lens cross-sectional view when focusing is made at infinity at a wide angle end of a zoom lens of Example 5 of the present invention. FIG. 10A and FIG. 10B are longitudinal aberration diagrams when the focusing is made at the infinity at the wide angle end and when the focusing is made at the infinity at a telephoto end of a zoom lens of Example 5. FIG. 11 is a lens cross-sectional view when the focusing is made at infinity at a wide angle end of a zoom lens of Example 6 of the present invention. FIG. 12A and FIG. 12B are longitudinal aberration diagrams when the focusing is made at the infinity at the wide angle end and when the focusing is made at the infinity at a telephoto end of the zoom lens of Example 6.

Figure 13:
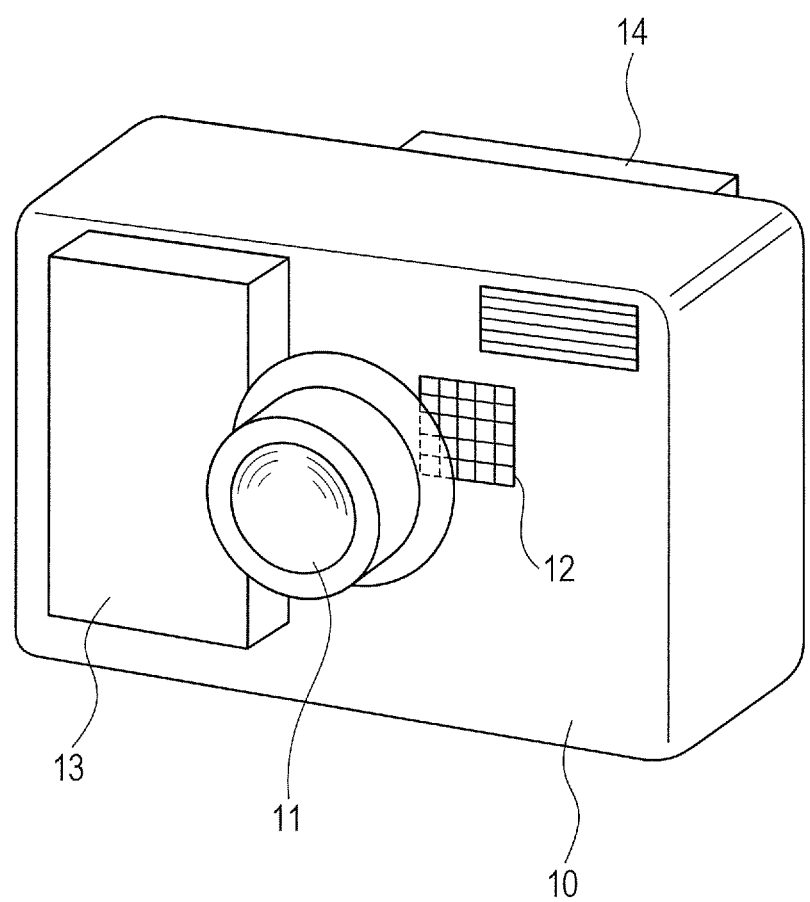
FIG. 13 is a schematic view of a main part of an image pickup apparatus according to the present invention.

FIG. 13 is a schematic view of a main part of a camera (image pickup apparatus) including the zoom lens of the present invention. The zoom lens of each of Examples is an image pickup optical system which is to be used in an image pickup apparatus, such as a video camera, a digital camera, and a silver-halide film camera. In the lens cross-sectional view, the left side is the object side (front side), and the right side is the image side (rear side). In the lens cross-sectional views, a zoom lens is denoted by L0, an order of a lens unit from the object side is denoted by i, and an i-th lens unit is denoted by Li.

There are illustrated a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power. A sixth lens unit L6 having a negative refractive power is also illustrated. Moreover, an aperture stop SP configured to adjust an amount of light is arranged on the object side of the third lens unit L3. A flare cut stop FS having a constant aperture diameter is located on the image side of the lens unit arranged closest to the image side. The arrangement of the aperture stop SP and the flare cut stop FS is not limited to the above-mentioned arrangement, and the aperture stop SP and the flare cut stop FS may be arranged at arbitrary positions.

On an image plane IP, an image pickup plane of a solid-state image pickup element (photo-electric conversion element), such as a CCD sensor or a CMOS sensor is put when the zoom lens of the present invention is used as a photographing optical system of a video camera or a digital still camera, and a photosensitive surface corresponding to a film surface is put when the zoom lens of the present invention is used for a silver-halide film camera. In the lens cross-sectional views, the arrows indicate loci of movements of the lens units during zooming from the wide angle end to the telephoto end. The arrow regarding focus indicates a movement direction of a focus unit LF during focusing from the infinity to close distance. During focusing from an object at infinity to a close distance object, the fifth lens unit L5 is configured to move toward the image side as indicated by the arrow.

Next, features of a lens configuration of a zoom lens in each of Examples of the present invention are described. It is a one object of the present invention to downsize a focus lens unit in a positive-lead type zoom lens, in which a lens unit having a positive refractive power is arranged closest to the object side. In the positive-lead type zoom lens, the first lens unit has a large lens diameter, and often includes a plurality of lenses.

Therefore, a lens unit having a relatively small lens diameter on the image side other than the first lens unit is adopted as the focus lens unit. Moreover, when the focus lens unit consists of one lens element, a reduction in weight and securing a movement amount become easy. The term "lens element" as used herein refers to an integrally formed lens, such as a single lens, a cemented lens formed by cementing a plurality of lenses, or a replica aspherical lens formed by laminating a resin layer on a surface of a spherical lens.

When the focus lens unit consists of a small number of lenses, and when variations in aberrations accompanying focusing are to be suppressed, a refractive power of the focus lens unit tends to become smaller. When the refractive power of the focus lens unit becomes much smaller, during focusing from an object point at infinity to an object point at close proximity, the movement amount of the focus lens unit is increased, and the zoom lens is increased in size. In order to achieve reductions in size and weight of the focus lens unit, and the downsizing and high optical characteristics of the zoom lens at the same time, it becomes important to appropriately set the lens configuration, the movement amount and the refractive power of the focus lens unit, and other such factors so that the variations in aberrations accompanying focusing become relatively smaller.

The zoom lens of each of Examples 1 to 5 of the present invention includes, in order from an object side to an image side, a first lens unit L1 having a positive refractive power, a second lens unit L2 having a negative refractive power, a third lens unit L3 having a positive refractive power, a fourth lens unit L4 having a positive refractive power, a fifth lens unit L5 having a negative refractive power, and a sixth lens unit L6 having a negative refractive power. The zoom lens of Example 6 includes, in order from an object side to an image side, the following lens units: a first lens unit L1 having a positive refractive power, a second lens unit L2 having a negative refractive power, a third lens unit L3 having a positive refractive power, a fourth lens unit L4 having a positive refractive power, and a fifth lens unit L5 having a negative refractive power.

In each of Examples, during zooming from the wide angle end to the telephoto end, all of the first lens unit L1, the third lens unit L3, the fourth lens unit L4, and the fifth lens unit L5 are configured to move toward the object side. In each of Examples, an interval between each pair of adjacent lens units is changed during zooming. In each of Examples, the fifth lens unit L5 is configured to move in the optical axis direction during focusing. During focusing from the object at infinity to the close distance object, the fifth lens unit L5 is configured to move toward the image side.

The zoom lens of each of Examples 1 to 3 and 6 of the present invention has an image blur correction function in which the entire second lens unit L2 is configured to move in a direction having a component in a direction perpendicular to an optical axis to move an image forming position. Similarly, the zoom lens of each of Examples 4 and 5 has an image blur correction function in which a second lens sub-unit L2b, which is a part of the second lens unit L2, is configured to move in a direction having a component in a direction perpendicular to an optical axis to move an image forming position.

In the present invention, a lens structure length (thickness) of the fifth lens unit L5 is designed to be relatively short to increase a movement amount of the fifth lens unit L5 during zooming. In this manner, magnification varying is shared with the other lens units in a balanced manner to obtain good optical characteristics.

The fifth lens unit L5 is configured to move toward the object side during zooming from the wide angle end to the telephoto end. Moreover, the fifth lens unit L5 is configured to move toward an image plane side during focusing from infinity to close proximity. The fifth lens unit L5 needs to be extended by a large amount on a telephoto side during focusing. Therefore, the above-mentioned configuration is adopted to secure large space for the movement during focusing with the fifth lens unit L5 at the telephoto end.

In each of Examples, a focal length of the zoom lens at the wide angle end is represented by fw, a focal length of the third lens unit is represented by f3, and the movement amount of the fifth lens unit during zooming from the wide angle end to the telephoto end is represented by m5. The term "movement amount" refers to a difference between positions on the optical axis of each lens unit at the wide angle end and the telephoto end, and the movement amount has a negative sign when the lens unit is positioned on the object side at the telephoto end as compared to the wide angle end, and has a positive sign when the lens unit is positioned on the image side at the telephoto end as compared to the wide angle end.

At this time, the following conditional expressions are satisfied:

$$0.4 < f3/fw < 1.0 \quad (1); \text{ and}$$

$$-1.0 < m5/fw < -0.5 \quad (2).$$

Next, technical meanings of the conditional expressions described above are described.

The conditional expression (1) is intended to appropriately set the positive refractive power of the third lens unit L3 to downsize the entire system while securing the high optical characteristics. When the ratio falls below the lower limit value of the conditional expression (1), and the positive refractive power of the third lens unit L3 becomes much stronger, variations in various aberrations, such as spherical aberration and coma, are increased during zooming, and it becomes difficult to suppress a variation in optical characteristics during zooming. When the ratio exceeds the upper limit value of the conditional expression (1), and the positive refractive power of the third lens unit L3 becomes much weaker, a variation in magnification during zooming becomes smaller, and a movement amount of the third lens unit L3 during zooming is increased, with the result that the zoom lens is disadvantageously increased in size.

The conditional expression (2) is intended to appropriately set the movement amount of the fifth lens unit L5 during zooming to obtain the high optical characteristics during zooming and focusing. When the ratio falls below the lower limit value of the conditional expression (2), and the movement amount of the fifth lens unit L5 during zooming becomes larger, the zoom lens is disadvantageously increased in size. When the ratio exceeds the upper limit value of the conditional expression (2), and the movement amount of the fifth lens unit L5 during zooming becomes much smaller, the variation in magnification becomes smaller, and refractive powers of the other lens units need to be increased to obtain a predetermined magnification-varying ratio. As a result, the various aberrations are disadvantageously increased.

In addition, the space for the movement during focusing is reduced, and there arises a need to increase the negative refractive power of the fifth lens unit L5, with the result that the variations in various aberrations are disadvantageously increased during focusing. It is more preferred to set the numerical value ranges of the conditional expressions (1) and (2) as follows:

$$0.6 < f3/fw < 0.9 \quad (1a); \text{ and}$$

$$-0.90 < m5/fw < -0.65 \quad (2a).$$

In the present invention, in order to further downsize the entire system, and to obtain the high optical characteristics over the entire zoom range, it is desired to satisfy at least one of the conditional expressions provided below.

The movement amount of the third lens unit L3 during zooming from the wide angle end to the telephoto end is represented by m3. A focal length of the fifth lens unit L5 is represented by f5, and the thickness of the fifth lens unit L5 on the optical axis is represented by L5d. A focal length of the zoom lens at the telephoto end is represented by ft. Moreover, a curvature radius of a lens surface closest to the object side of the fifth lens unit L5 is represented by R5o, and a curvature radius of a lens surface closest to the image side of the fifth lens unit L5 is represented by R5i. A movement amount of the fourth lens unit L4 during zooming from the wide angle end to the telephoto end is represented by m4. Further, a movement amount of the first lens unit L1 during zooming from the wide angle end to the telephoto end is represented by m1, and a focal length of the first lens unit L1 is represented by f1.

Then, it is preferred to satisfy at least one of the following conditional expressions:

$$-0.5 < m3/fw < -0.2 \quad (3);$$

$$-1.2 < f5/fw < -0.7 \quad (4);$$

$$0.005 < L5d/ft < 0.017 \quad (5);$$

$$-2.9 < (R5i-R5o)/(R5i+R5o) < -1.6 \quad (6);$$

$$-1.0 < f3/f5 < -0.6 \quad (7);$$

$$-0.50 < (m4-m3)/fw < -0.10 \quad (8);$$

$$-1.2 < m1/fw < -0.7 \quad (9); \text{ and}$$

$$1.6 < f1/fw < 3.0 \quad (10).$$

The conditional expression (3) relates to a distance (movement amount) by which the third lens unit L3 is moved on the optical axis during zooming. When the ratio falls below the lower limit value of the conditional expression (3), and the movement amount of the third lens unit L3 during zooming becomes much larger, the zoom lens is disadvantageously increased in size.

When the ratio exceeds the upper limit value of the conditional expression (3), and the movement amount of the third lens unit L3 during zooming becomes much smaller, there arises a need to increase the positive refractive power of the third lens unit L3 to obtain a desired zoom ratio. Then, variations in the spherical aberration, coma, and the like are increased during zooming, and it becomes difficult to obtain the high optical characteristics over the entire zoom range. It is more preferred to set the conditional expression (3) as follows:

$$-0.45 < m3/fw < -0.25 \quad (3a).$$

The conditional expression (4) relates to the negative refractive power of the fifth lens unit L5. When the ratio falls below the lower limit value of the conditional expression (4), and the negative refractive power of the fifth lens unit L5 becomes much weaker, that is, an absolute value of the negative refractive power becomes much smaller, the movement amount of the fifth lens unit L5 during zooming is increased, and the zoom lens is increased in size. When the ratio exceeds the upper limit value of the conditional expression (4), and the negative refractive power of the fifth lens unit L5 becomes much stronger, that is, the absolute value of the negative refractive power becomes much larger, the variations in various aberrations are increased during focusing, and it becomes difficult to reduce the variations in various aberrations. It is more preferred to set the conditional expression (4) as follows:

$$-1.15 < f5/fw < -0.95 \quad (4a).$$

The conditional expression (5) relates to the thickness of the fifth lens unit L5. When the ratio falls below the lower limit value of the conditional expression (5), and the thickness of the fifth lens unit L5 becomes much smaller, it becomes difficult to process each lens. When the ratio exceeds the upper limit value of the conditional expression (5), and the thickness of the fifth lens unit L5 becomes much larger, it becomes difficult to secure large space for the movement during zooming and focusing. It is more preferred to set the conditional expression (5) as follows:

$$0.009 < L5d/ft < 0.015 \quad (5a).$$

The conditional expression (6) relates to a lens shape of the fifth lens unit L5. When the ratio falls below or exceeds the lower limit value or the upper limit value of the conditional expression (6), the variations in aberrations accompanying focusing are increased, and it becomes difficult to reduce variations in aberration. It is more preferred to set the conditional expression (6) as follows:

$$-2.85 < (R5i-R5o)/(R5i+R5o) < -1.75 \quad (6a).$$

The conditional expression (7) relates to a ratio between the positive refractive power of the third lens unit L3 and the negative refractive power of the fifth lens unit L5. When the ratio falls below the lower limit value of the conditional expression (7), and the negative refractive power of the fifth lens unit L5 becomes much stronger, the variations in aberration are increased during focusing, and it becomes difficult to obtain the high optical characteristics over the entire object distance. When the ratio exceeds the upper limit value of the conditional expression (7), and the positive refractive power of the third lens unit L3 becomes much stronger, variations in aberration are increased during zooming, and it becomes difficult to obtain the high optical characteristics over the entire zoom range. It is more preferred to set the conditional expression (7) as follows:

$$-0.90 < f3/f5 < -0.65 \quad (7a).$$

The conditional expression (8) relates to a relative movement amount between the third lens unit L3 and the fourth lens unit L4 during zooming. When the ratio falls below the lower limit value of the conditional expression (8), and the relative movement amount becomes much larger, the zoom lens is increased in size. When the ratio exceeds the upper limit value of the conditional expression (8), and the relative movement amount becomes much smaller, the positive refractive power of the third lens unit L3 or the positive refractive power of the fourth lens unit L4 is increased to obtain the desired zoom ratio, and the variations in aberration are increased during zooming. Then, it becomes difficult to obtain the high optical characteristics over the entire zoom range. It is more preferred to set the conditional expression (8) as follows:

$$-0.40 < (m4-m3)/fw < -0.20 \quad (8a).$$

The conditional expression (9) relates to the movement amount of the first lens unit L1 during zooming. When the ratio falls below the lower limit value of the conditional expression (9), and the movement amount of the first lens unit L1 becomes much larger, the zoom lens is disadvantageously increased in size. When the ratio exceeds the upper limit value of the conditional expression (9), and the movement amount of the first lens unit L1 becomes much smaller, there arises a need to increase the positive refractive power of the first lens unit L1 to obtain the desired zoom ratio. Then, variations in field curvature and the like are increased during zooming, and it becomes difficult to reduce the variations. It is more preferred to set the conditional expression (9) as follows:

$$-1.0<m1/fw<-0.8 \quad (9a)$$

The conditional expression (10) relates to the positive refractive power of the first lens unit L1. When the ratio falls below the lower limit value of the conditional expression (10), and the positive refractive power of the first lens unit L1 becomes much stronger, the variation in field curvature is increased during zooming, and it becomes difficult to reduce the variation. When the ratio exceeds the upper limit value of the conditional expression (10), and the positive refractive power of the first lens unit L1 becomes much weaker, the movement amount of the first lens unit L1 is increased to obtain the desired zoom ratio, and the zoom lens is disadvantageously increased in size. It is more preferred to set the conditional expression (10) as follows:

$$1.8<f1/fw<2.6 \quad (10a)$$

In each of Examples, it is preferred that the fifth lens unit L5 consist of two lenses. More specifically, it is preferred that the fifth lens unit L5 consist of a cemented lens obtained by cementing a positive lens and a negative lens. In this manner, in each of Examples, the fifth lens unit L5 consists of the cemented lens obtained by cementing the two lenses: the lens having the positive refractive power and the lens having the negative refractive power to facilitate the reduction in weight of the fifth lens unit L5, which functions as the focus lens unit. Then, a sufficient movement amount can be obtained during focusing.

Next, Example in which the zoom lens of the present invention is used as a photographing optical system is described with reference to FIG. 13. FIG. 13 is an illustration of an image pickup apparatus 10 that is an example of image pickup apparatus and includes an image pickup optical system 11 including the zoom lens of the present invention, and an image pickup element (photo-electric conversion element) 12, such as a CCD sensor or a CMOS sensor configured to receive light of an object image formed by the image pickup optical system 11. In addition, the image pickup apparatus 10 includes a recording unit 13 configured to record the object image received by the image pickup element 12, and a viewfinder 14 for observing the object image displayed on a display element (not shown). The display element is formed of a liquid crystal panel or the like, and displays the object image formed on the image pickup element 12.

In this manner, the zoom lens of the present invention may be applied to an image pickup apparatus, such as a digital camera to realize an image pickup apparatus having the high optical characteristics. The present invention may equally be applied to a single lens reflex (SLR) camera without a quick return mirror. The zoom lens of the present invention may equally be applied to a video camera.

Although the exemplary embodiments of the present invention have been described so far, the present invention is by no means limited to those embodiments, and hence various changes and modifications can be made within the scope of the subject matter of the present invention. As described above, according to each of Examples, the zoom lens having the high optical characteristics over the entire zoom range and the entire object distance can be obtained.

Numerical Data 1 to 6 corresponding to Examples 1 to 6 are described below. In each of Numerical Data, indicates the order of surfaces from the object side, ri indicates the curvature radius of i-th (i-th surface), di indicates an interval between the i-th surface and the (i+1)th surface, and ndi and vdi indicate the refractive index and Abbe number of a material based on the d-line, respectively. An image height is a highest image height that determines the half field angle. A total lens length is a length from the first lens surface to the image plane.

Moreover, the focal lengths, the f-numbers, and the like are shown. Further, the zoom lens unit data indicates the focal length, a length on the optical axis, a front principal point position, and a rear principal point position of each lens unit. In each of Examples 4 and 5, a first lens sub-unit 2a and a second lens sub-unit 2b, each of which is a part of the second lens unit L2, are shown. In addition, correspondence between each of the conditional expressions described above and numerical values in Numerical Examples is shown in Table 1.

Example 1

Unit mm

Surface Data

| Surface number | r | d | nd | vd | Effective diameter |
|---|---|---|---|---|---|
| 1 | 92.181 | 5.21 | 1.48749 | 70.2 | 50.13 |
| 2 | −22,314.072 | 0.18 | | | 49.47 |
| 3 | 88.150 | 2.50 | 1.91082 | 35.3 | 48.03 |
| 4 | 54.276 | 6.02 | 1.49700 | 81.5 | 46.25 |
| 5 | 278.782 | (Variable) | | | 45.77 |
| 6 | −255.552 | 1.28 | 1.77250 | 49.6 | 23.98 |
| 7 | 23.891 | 3.40 | 1.80809 | 22.8 | 22.18 |
| 8 | 57.125 | 2.41 | | | 21.90 |
| 9 | −52.724 | 1.28 | 1.80400 | 46.6 | 21.91 |
| 10 | −485.087 | (Variable) | | | 22.37 |
| 11 (Stop) | ∞ | 1.90 | | | 24.71 |
| 12 | 3,050.345 | 2.66 | 1.83481 | 42.7 | 25.38 |
| 13 | −82.648 | 0.10 | | | 25.67 |
| 14 | 45.855 | 5.49 | 1.49700 | 81.5 | 25.89 |
| 15 | −50.437 | 1.40 | 2.00100 | 29.1 | 25.60 |
| 16 | −127.669 | (Variable) | | | 25.66 |
| 17 | −221.224 | 2.10 | 1.84666 | 23.9 | 22.27 |
| 18 | 63.597 | 1.58 | | | 22.95 |
| 19 | 354.470 | 5.39 | 1.83400 | 37.2 | 23.53 |
| 20 | −62.248 | 0.15 | | | 25.03 |
| 21 | 47.085 | 4.00 | 1.60311 | 60.6 | 26.19 |
| 22 | −227.787 | (Variable) | | | 26.18 |
| 23 | −122.223 | 3.14 | 1.78472 | 25.7 | 25.13 |
| 24 | −38.737 | 1.10 | 1.62230 | 53.2 | 25.21 |
| 25 | 56.809 | (Variable) | | | 25.13 |
| 26 | −42.457 | 3.51 | 1.48749 | 70.2 | 30.43 |
| 27 | −27.818 | 1.50 | 1.83481 | 42.7 | 30.98 |
| 28 | −41.277 | 0.20 | | | 32.47 |
| 29 | ∞ | BF | | | 33.35 |
| Image plane | ∞ | | | | |

Various data
Zoom ratio 4.03

| | Wide angle | Intermediate | Telephoto |
|---|---|---|---|
| Focal length | 72.00 | 144.00 | 290.00 |
| F-number | 4.16 | 5.02 | 5.88 |
| Half field angle (degree) | 16.72 | 8.54 | 4.27 |
| Image height | 21.64 | 21.64 | 21.64 |
| Total lens length | 182.00 | 222.47 | 249.19 |
| BF | 40.00 | 40.00 | 40.00 |
| d5 | 5.00 | 45.47 | 72.19 |
| d10 | 25.71 | 16.45 | 2.21 |
| d16 | 32.39 | 18.39 | 12.72 |
| d22 | 13.85 | 6.89 | 2.07 |
| d25 | 8.54 | 38.76 | 63.48 |
| Entrance pupil position | 42.62 | 132.66 | 217.16 |
| Exit pupil position | −64.29 | −72.95 | −83.81 |

-continued

Unit mm

| | | | |
|---|---|---|---|
| Front principal point position | 64.92 | 93.07 | −172.08 |
| Rear principal point position | −32.00 | −104.00 | −250.00 |

Zoom lens unit data

| Unit | First surface | Focal length | Lens structure length | Front principal point position | Rear principal point position |
|---|---|---|---|---|---|
| 1 | 1 | 154.67 | 13.91 | −2.40 | −11.19 |
| 2 | 6 | −33.46 | 8.37 | 3.47 | −2.19 |
| 3 | 11 | 52.23 | 11.55 | 3.26 | −4.57 |
| 4 | 17 | 61.89 | 13.23 | 10.14 | 2.57 |
| 5 | 23 | −75.33 | 4.24 | 1.45 | −0.96 |
| 6 | 26 | −319.37 | 5.21 | −11.26 | −15.19 |

Single lens data

| Lens | First surface | Focal length |
|---|---|---|
| 1 | 1 | 188.33 |
| 2 | 3 | −160.73 |
| 3 | 4 | 134.41 |
| 4 | 6 | −28.23 |
| 5 | 7 | 48.59 |
| 6 | 9 | −73.67 |
| 7 | 12 | 96.43 |
| 8 | 14 | 49.26 |
| 9 | 15 | −84.05 |
| 10 | 17 | −58.15 |
| 11 | 19 | 63.86 |
| 12 | 21 | 65.05 |
| 13 | 23 | 71.09 |
| 14 | 24 | −36.85 |
| 15 | 26 | 153.46 |
| 16 | 27 | −107.66 |

Example 2

Unit mm

Surface Data

| Surface number | r | d | nd | vd | Effective diameter |
|---|---|---|---|---|---|
| 1 | 93.073 | 5.46 | 1.48749 | 70.2 | 53.10 |
| 2 | 2,763.058 | 0.18 | | | 52.42 |
| 3 | 86.447 | 2.50 | 1.91082 | 35.3 | 50.19 |
| 4 | 56.179 | 7.28 | 1.43875 | 94.9 | 47.74 |
| 5 | 443.372 | (Variable) | | | 46.48 |
| 6 | −235.461 | 1.28 | 1.77250 | 49.6 | 23.71 |
| 7 | 23.714 | 3.33 | 1.80809 | 22.8 | 21.86 |
| 8 | 54.951 | 2.79 | | | 21.46 |
| 9 | −48.038 | 1.28 | 1.80400 | 46.6 | 21.48 |
| 10 | −238.334 | (Variable) | | | 21.99 |
| 11 (Stop) | ∞ | 1.90 | | | 24.66 |
| 12 | 1,904.344 | 2.71 | 1.83481 | 42.7 | 25.34 |
| 13 | −80.120 | 0.10 | | | 25.64 |
| 14 | 46.101 | 5.50 | 1.49700 | 81.5 | 25.85 |
| 15 | −49.950 | 1.40 | 2.00100 | 29.1 | 25.55 |
| 16 | −120.194 | (Variable) | | | 25.61 |
| 17 | −155.393 | 4.04 | 1.85478 | 24.8 | 21.68 |
| 18 | 62.765 | 1.71 | | | 22.99 |
| 19 | 259.108 | 4.18 | 1.83400 | 37.2 | 23.77 |
| 20 | −59.718 | 0.15 | | | 24.79 |
| 21 | 45.366 | 4.07 | 1.60311 | 60.6 | 26.00 |
| 22 | −217.536 | (Variable) | | | 25.99 |
| 23 | −132.100 | 3.16 | 1.78472 | 25.7 | 24.91 |
| 24 | −38.954 | 1.10 | 1.62230 | 53.2 | 24.97 |
| 25 | 51.973 | (Variable) | | | 24.83 |
| 26 | −48.471 | 4.17 | 1.48749 | 70.2 | 30.10 |
| 27 | −28.169 | 1.50 | 1.83481 | 42.7 | 30.71 |
| 28 | −44.993 | 0.20 | | | 32.20 |
| 29 | ∞ | BF | | | 33.01 |
| Image plane | ∞ | | | | |

Various data
Zoom ratio 4.03

| | Wide angle | Intermediate | Telephoto |
|---|---|---|---|
| Focal length | 72.00 | 141.73 | 290.00 |
| F-number | 4.16 | 5.03 | 5.88 |
| Half field angle (degree) | 16.72 | 8.68 | 4.27 |
| Image height | 21.64 | 21.64 | 21.64 |
| Total lens length | 182.00 | 223.86 | 250.50 |
| BF | 40.00 | 40.00 | 40.00 |
| d5 | 5.00 | 46.86 | 73.50 |
| d10 | 24.77 | 16.84 | 2.20 |
| d16 | 31.49 | 17.48 | 13.51 |
| d22 | 12.70 | 5.95 | 2.00 |
| d25 | 8.08 | 36.78 | 59.32 |
| Entrance pupil position | 43.80 | 140.82 | 229.25 |
| Exit pupil position | −62.62 | −70.36 | −81.17 |
| Front principal point position | 65.28 | 100.53 | −174.81 |
| Rear principal point position | −32.00 | −101.73 | −250.00 |

Zoom lens unit data

| Unit | First surface | Focal length | Lens structure length | Front principal point position | Rear principal point position |
|---|---|---|---|---|---|
| 1 | 1 | 155.98 | 15.41 | −2.04 | −12.06 |
| 2 | 6 | −32.75 | 8.68 | 3.49 | −2.49 |
| 3 | 11 | 50.20 | 11.61 | 3.37 | −4.50 |
| 4 | 17 | 60.77 | 14.14 | 10.87 | 2.85 |
| 5 | 23 | −72.25 | 4.26 | 1.58 | −0.84 |
| 6 | 26 | −301.86 | 5.87 | −10.00 | −14.31 |

Single lens data

| Lens | First surface | Focal length |
|---|---|---|
| 1 | 1 | 197.45 |
| 2 | 3 | −183.38 |
| 3 | 4 | 145.79 |
| 4 | 6 | −27.83 |
| 5 | 7 | 49.28 |
| 6 | 9 | −75.06 |
| 7 | 12 | 92.16 |
| 8 | 14 | 49.17 |
| 9 | 15 | −86.24 |
| 10 | 17 | −51.86 |
| 11 | 19 | 58.54 |
| 12 | 21 | 62.60 |
| 13 | 23 | 69.37 |
| 14 | 24 | −35.61 |
| 15 | 26 | 129.26 |
| 16 | 27 | −94.05 |

Example 3

Unit mm

Surface Data

| Surface number | r | d | nd | vd | Effective diameter |
|---|---|---|---|---|---|
| 1 | 98.748 | 4.50 | 1.48749 | 70.2 | 51.64 |
| 2 | 540.471 | 0.18 | | | 51.01 |
| 3 | 98.965 | 2.50 | 1.91082 | 35.3 | 49.60 |

-continued

| | | Unit mm | | | |
|---|---|---|---|---|---|
| 4 | 60.858 | 7.16 | 1.49700 | 81.5 | 47.45 |
| 5 | -2,177.277 | (Variable) | | | 46.49 |
| 6 | -155.775 | 1.28 | 1.76385 | 48.5 | 25.32 |
| 7 | 24.339 | 3.86 | 1.85478 | 24.8 | 23.40 |
| 8 | 73.160 | 2.08 | | | 23.07 |
| 9 | -69.381 | 1.28 | 1.76385 | 48.5 | 23.07 |
| 10 | 186.784 | (Variable) | | | 23.39 |
| 11 | 287.629 | 3.02 | 1.76385 | 48.5 | 25.58 |
| 12 | -79.550 | 1.67 | | | 25.83 |
| 13 (Stop) | ∞ | 0.47 | | | 25.84 |
| 14 | 49.202 | 5.01 | 1.49700 | 81.5 | 25.86 |
| 15 | -60.936 | 1.40 | 2.00100 | 29.1 | 25.52 |
| 16 | -197.614 | (Variable) | | | 25.47 |
| 17 | -74.496 | 3.00 | 1.85478 | 24.8 | 23.03 |
| 18 | 89.897 | 0.88 | | | 24.21 |
| 19 | 1,946.375 | 3.24 | 1.91082 | 35.3 | 24.28 |
| 20 | -52.519 | 0.15 | | | 24.92 |
| 21 | 55.741 | 3.64 | 1.67790 | 55.3 | 25.75 |
| 22 | -212.197 | (Variable) | | | 25.68 |
| 23 | -128.810 | 2.76 | 1.92286 | 20.9 | 25.03 |
| 24 | -46.507 | 1.10 | 1.65412 | 39.7 | 25.16 |
| 25 | 59.003 | (Variable) | | | 25.17 |
| 26 | 835.325 | 6.31 | 1.56732 | 42.8 | 31.43 |
| 27 | -31.819 | 2.17 | 1.76385 | 48.5 | 31.61 |
| 28 | -242.936 | 0.20 | | | 32.80 |
| 29 | ∞ | BF | | | 32.99 |
| Image plane | ∞ | | | | |

Various data
Zoom ratio 4.03

| | Wide angle | Intermediate | Telephoto |
|---|---|---|---|
| Focal length | 72.00 | 144.00 | 290.00 |
| F-number | 4.16 | 4.78 | 5.88 |
| Half field angle (degree) | 16.72 | 8.54 | 4.27 |
| Image height | 21.64 | 21.64 | 21.64 |
| Total lens length | 182.00 | 224.89 | 246.61 |
| BF | 40.00 | 40.00 | 40.00 |
| d5 | 2.39 | 45.28 | 67.00 |
| d10 | 28.57 | 20.56 | 1.88 |
| d16 | 33.95 | 14.34 | 9.89 |
| d22 | 14.01 | 4.87 | 2.02 |
| d25 | 5.23 | 41.98 | 67.97 |
| Entrance pupil position | 41.97 | 145.11 | 205.50 |
| Exit pupil position | -56.99 | -67.26 | -81.08 |
| Front principal point position | 60.52 | 95.78 | -199.09 |
| Rear principal point position | -32.00 | -104.00 | -250.00 |

Zoom lens unit data

| Unit | First surface | Focal length | Lens structure length | Front principal point position | Rear principal point position |
|---|---|---|---|---|---|
| 1 | 1 | 148.27 | 14.34 | -0.23 | -9.50 |
| 2 | 6 | -35.00 | 8.50 | 3.77 | -1.76 |
| 3 | 11 | 52.40 | 11.56 | 1.89 | -6.00 |
| 4 | 17 | 69.84 | 10.91 | 9.26 | 3.41 |
| 5 | 23 | -79.77 | 3.86 | 1.19 | -0.89 |
| 6 | 26 | -430.37 | 8.67 | 3.55 | -1.92 |

Single lens data

| Lens | First surface | Focal length |
|---|---|---|
| 1 | 1 | 247.02 |
| 2 | 3 | -179.13 |
| 3 | 4 | 119.25 |
| 4 | 6 | -27.47 |
| 5 | 7 | 41.17 |
| 6 | 9 | -66.09 |
| 7 | 11 | 81.87 |
| 8 | 14 | 55.61 |
| 9 | 15 | -88.47 |
| 10 | 17 | -47.26 |

-continued

| | Unit mm | | |
|---|---|---|---|
| 11 | 19 | | 56.19 |
| 12 | 21 | | 65.48 |
| 13 | 23 | | 77.62 |
| 14 | 24 | | -39.60 |
| 15 | 26 | | 54.17 |
| 16 | 27 | | -48.15 |

Example 4

Unit mm

Surface Data

| Surface number | r | d | nd | vd | Effective diameter |
|---|---|---|---|---|---|
| 1 | 112.986 | 5.06 | 1.48749 | 70.2 | 52.00 |
| 2 | ∞ | 0.18 | | | 51.28 |
| 3 | 116.214 | 2.05 | 1.83400 | 37.2 | 49.75 |
| 4 | 63.216 | 6.98 | 1.49700 | 81.5 | 47.77 |
| 5 | 3,086.687 | (Variable) | | | 47.01 |
| 6 | -150.825 | 4.72 | 1.53172 | 48.8 | 33.00 |
| 7 | -35.503 | 1.52 | 1.51823 | 58.9 | 32.13 |
| 8 | -129.211 | 4.85 | | | 29.89 |
| 9 | -188.589 | 1.06 | 1.77250 | 49.6 | 24.76 |
| 10 | 26.441 | 3.71 | 1.85478 | 24.8 | 23.61 |
| 11 | 69.634 | 2.44 | | | 23.30 |
| 12 | -57.517 | 1.01 | 1.77250 | 49.6 | 23.30 |
| 13 | 704.223 | (Variable) | | | 23.70 |
| 14 (Stop) | ∞ | 0.98 | | | 24.52 |
| 15 | 86.311 | 3.22 | 1.66672 | 48.3 | 25.10 |
| 16 | -86.311 | 0.20 | | | 25.21 |
| 17 | 54.443 | 4.84 | 1.48749 | 70.2 | 25.28 |
| 18 | -54.443 | 1.18 | 2.00100 | 29.1 | 25.09 |
| 19 | -485.294 | (Variable) | | | 25.21 |
| 20 | 105.879 | 1.21 | 2.00100 | 29.1 | 26.13 |
| 21 | 45.270 | 1.41 | | | 25.89 |
| 22 | 141.700 | 3.82 | 1.48749 | 70.2 | 25.94 |
| 23 | -64.011 | 0.15 | | | 26.33 |
| 24 | 41.864 | 4.61 | 1.67790 | 55.3 | 27.60 |
| 25 | -242.202 | (Variable) | | | 27.54 |
| 26 | -108.146 | 2.54 | 1.80809 | 22.8 | 26.17 |
| 27 | -46.974 | 1.13 | 1.51742 | 52.4 | 26.14 |
| 28 | 38.410 | (Variable) | | | 25.69 |
| 29 | -59.829 | 2.22 | 1.48749 | 70.2 | 30.64 |
| 30 | -135.939 | 0.20 | | | 31.56 |
| 31 | ∞ | BF | | | 31.89 |
| Image plane | ∞ | | | | |

Various data
Zoom ratio 4.03

| | Wide angle | Intermediate | Telephoto |
|---|---|---|---|
| Focal length | 72.00 | 144.00 | 290.00 |
| F-number | 4.16 | 4.99 | 5.83 |
| Half field angle (degree) | 16.72 | 8.54 | 4.27 |
| Image height | 21.64 | 21.64 | 21.64 |
| Total lens length | 188.00 | 227.82 | 253.31 |
| BF | 37.80 | 37.80 | 37.80 |
| d5 | 2.42 | 42.28 | 67.73 |
| d13 | 29.62 | 19.13 | 2.40 |
| d19 | 36.36 | 25.04 | 20.65 |
| d25 | 11.73 | 5.25 | 2.30 |
| d28 | 8.78 | 37.08 | 61.14 |
| Entrance pupil position | 54.28 | 144.78 | 214.09 |
| Exit pupil position | -55.69 | -62.89 | -72.02 |
| Front principal point position | 70.83 | 82.84 | -261.68 |
| Rear principal point position | -34.20 | -106.20 | -252.20 |

-continued

Unit mm

Zoom lens unit data

| Unit | First surface | Focal length | Lens structure length | Front principal point position | Rear principal point position |
|---|---|---|---|---|---|
| 1 | 1 | 165.35 | 14.27 | −0.12 | −9.44 |
| 2a | 6 | 1,080.45 | 6.24 | 18.95 | 15.13 |
| 2b | 9 | −35.23 | 8.21 | 3.69 | −1.85 |
| 3 | 14 | 57.31 | 10.42 | 0.77 | −6.05 |
| 4 | 20 | 54.41 | 11.21 | 6.87 | −0.41 |
| 5 | 26 | −67.37 | 3.67 | 1.36 | −0.77 |
| 6 | 29 | −221.32 | 2.42 | −1.19 | −2.90 |

Single lens data

| Lens | First surface | Focal length |
|---|---|---|
| 1 | 1 | 231.77 |
| 2 | 3 | −169.19 |
| 3 | 4 | 129.76 |
| 4 | 6 | 86.10 |
| 5 | 7 | −94.99 |
| 6 | 9 | −29.96 |
| 7 | 10 | 47.97 |
| 8 | 12 | −68.79 |
| 9 | 15 | 65.21 |
| 10 | 17 | 56.67 |
| 11 | 18 | −61.35 |
| 12 | 20 | −79.80 |
| 13 | 22 | 91.00 |
| 14 | 24 | 53.00 |
| 15 | 26 | 100.90 |
| 16 | 27 | −40.66 |
| 17 | 29 | −221.32 |

Example 5

Unit mm

Surface Data

| Surface number | r | d | nd | vd | Effective diameter |
|---|---|---|---|---|---|
| 1 | 108.686 | 5.15 | 1.48749 | 70.2 | 52.00 |
| 2 | ∞ | 0.15 | | | 51.48 |
| 3 | 117.701 | 2.10 | 1.83400 | 37.2 | 50.37 |
| 4 | 64.332 | 7.00 | 1.49700 | 81.5 | 48.66 |
| 5 | 740.701 | (Variable) | | | 47.82 |
| 6 | −866.644 | 4.65 | 1.53172 | 48.8 | 32.96 |
| 7 | −43.671 | 1.65 | 1.51823 | 58.9 | 31.97 |
| 8 | −349.361 | 4.88 | | | 29.48 |
| 9 | −163.831 | 1.10 | 1.77250 | 49.6 | 24.85 |
| 10 | 26.373 | 3.20 | 1.85478 | 24.8 | 23.15 |
| 11 | 70.182 | 2.33 | | | 22.93 |
| 12 | −59.794 | 1.05 | 1.77250 | 49.6 | 22.93 |
| 13 | 497.341 | (Variable) | | | 23.32 |
| 14 (Stop) | ∞ | 0.98 | | | 24.44 |
| 15 | 85.803 | 3.25 | 1.66672 | 48.3 | 25.03 |
| 16 | −85.803 | 0.15 | | | 25.12 |
| 17 | 55.992 | 4.65 | 1.48749 | 70.2 | 24.90 |
| 18 | −55.992 | 1.25 | 2.00100 | 29.1 | 24.51 |
| 19 | −496.530 | (Variable) | | | 24.60 |
| 20 | 111.592 | 1.30 | 2.00100 | 29.1 | 25.89 |
| 21 | 46.446 | 1.28 | | | 25.68 |
| 22 | 122.313 | 3.90 | 1.48749 | 70.2 | 25.74 |
| 23 | −63.603 | 0.15 | | | 26.12 |
| 24 | 40.018 | 4.10 | 1.67790 | 55.3 | 27.60 |
| 25 | −682.473 | (Variable) | | | 27.51 |
| 26 | −129.824 | 2.50 | 1.80809 | 22.8 | 26.17 |
| 27 | −52.519 | 1.15 | 1.51742 | 52.4 | 26.21 |
| 28 | 39.368 | (Variable) | | | 25.86 |
| 29 | −54.446 | 1.55 | 1.48749 | 70.2 | 31.02 |
| 30 | −109.719 | 0.20 | | | 31.80 |
| 31 | ∞ | BF | | | 32.20 |
| Image plane | ∞ | | | | |

Various data
Zoom ratio 4.03

| | Wide angle | Intermediate | Telephoto |
|---|---|---|---|
| Focal length | 72.00 | 144.00 | 290.00 |
| F-number | 4.16 | 5.06 | 5.83 |
| Half field angle (degree) | 16.72 | 8.54 | 4.27 |
| Image height | 21.64 | 21.64 | 21.64 |
| Total lens length | 188.00 | 227.83 | 258.00 |
| BF | 37.80 | 37.80 | 37.80 |
| d5 | 1.99 | 41.81 | 71.99 |
| d13 | 29.22 | 17.55 | 2.44 |
| d19 | 37.95 | 25.64 | 22.47 |
| d25 | 11.85 | 5.73 | 2.42 |
| d28 | 9.52 | 39.63 | 61.21 |
| Entrance pupil position | 53.71 | 137.98 | 225.97 |
| Exit pupil position | −57.77 | −64.56 | −72.95 |
| Front principal point position | 71.47 | 79.40 | −243.42 |
| Rear principal point position | −34.20 | −106.20 | −252.20 |

Zoom lens unit data

| Unit | First surface | Focal length | Lens structure length | Front principal point position | Rear principal point position |
|---|---|---|---|---|---|
| 1 | 1 | 174.21 | 14.40 | −0.95 | −10.30 |
| 2a | 6 | 845.65 | 6.30 | 5.96 | 1.85 |
| 2b | 9 | −34.63 | 7.68 | 3.33 | −1.87 |
| 3 | 14 | 57.26 | 10.28 | 0.87 | −5.85 |
| 4 | 20 | 55.71 | 10.73 | 6.45 | −0.51 |
| 5 | 26 | −71.92 | 3.65 | 1.47 | −0.65 |
| 6 | 29 | −223.76 | 1.75 | −1.04 | −2.29 |

Single lens data

| Lens | First surface | Focal length |
|---|---|---|
| 1 | 1 | 222.95 |
| 2 | 3 | −173.22 |
| 3 | 4 | 141.27 |
| 4 | 6 | 86.32 |
| 5 | 7 | −96.49 |
| 6 | 9 | −29.33 |
| 7 | 10 | 47.82 |
| 8 | 12 | −69.04 |
| 9 | 15 | 64.84 |
| 10 | 17 | 58.22 |
| 11 | 18 | −63.14 |
| 12 | 20 | −80.28 |
| 13 | 22 | 86.43 |
| 14 | 24 | 55.89 |
| 15 | 26 | 107.59 |
| 16 | 27 | −43.30 |
| 17 | 29 | −223.76 |

Example 6

Unit mm

Surface Data

| Surface number | r | d | nd | vd | Effective diameter |
|---|---|---|---|---|---|
| 1 | 89.130 | 4.81 | 1.48749 | 70.2 | 51.90 |
| 2 | 453.679 | 0.18 | | | 51.24 |
| 3 | 88.477 | 2.50 | 1.91082 | 35.3 | 49.61 |
| 4 | 54.032 | 7.54 | 1.49700 | 81.5 | 47.15 |
| 5 | 14,077.485 | (Variable) | | | 46.18 |
| 6 | −204.550 | 1.28 | 1.76385 | 48.5 | 25.52 |
| 7 | 22.605 | 4.02 | 1.85478 | 24.8 | 23.39 |
| 8 | 64.462 | 2.11 | | | 22.73 |
| 9 | −71.774 | 1.28 | 1.76385 | 48.5 | 22.72 |
| 10 | 157.387 | (Variable) | | | 22.99 |
| 11 | 89.368 | 3.35 | 1.76385 | 48.5 | 25.25 |
| 12 | −108.716 | 1.16 | | | 25.34 |
| 13 (Stop) | ∞ | 1.26 | | | 25.19 |
| 14 | 83.981 | 4.52 | 1.49700 | 81.5 | 25.01 |
| 15 | −45.511 | 1.40 | 2.00100 | 29.1 | 24.72 |
| 16 | −137.223 | (Variable) | | | 24.79 |
| 17 | −169.546 | 3.00 | 1.85478 | 24.8 | 24.07 |
| 18 | 77.899 | 1.07 | | | 24.94 |
| 19 | 962.231 | 3.15 | 1.91082 | 35.3 | 25.04 |
| 20 | −59.764 | 0.15 | | | 25.60 |
| 21 | 58.811 | 5.00 | 1.67790 | 55.3 | 26.33 |
| 22 | −644.873 | (Variable) | | | 26.18 |
| 23 | −181.255 | 2.65 | 1.92286 | 20.9 | 25.56 |
| 24 | −56.364 | 1.10 | 1.65412 | 39.7 | 25.58 |
| 25 | 54.768 | (Variable) | | | 25.34 |
| 26 | ∞ | BF | | | 29.86 |
| Image plane | ∞ | | | | |

Various data
Zoom ratio 4.03

| | Wide angle | Intermediate | Telephoto |
|---|---|---|---|
| Focal length | 72.00 | 144.00 | 290.00 |
| F-number | 4.16 | 4.76 | 5.88 |
| Half field angle (degree) | 16.72 | 8.54 | 4.27 |
| Image height | 21.64 | 21.64 | 21.64 |
| Total lens length | 182.00 | 222.18 | 242.31 |
| BF | 40.00 | 61.81 | 86.29 |
| d5 | 2.42 | 42.60 | 62.72 |
| d10 | 28.53 | 20.78 | 1.88 |
| d16 | 30.86 | 16.79 | 11.21 |
| d22 | 16.01 | 6.34 | 2.12 |
| d25 | 12.64 | 22.32 | 26.53 |
| Entrance pupil position | 43.76 | 145.54 | 200.17 |
| Exit pupil position | −63.21 | −56.69 | −53.55 |
| Front principal point position | 65.53 | 114.55 | −111.23 |
| Rear principal point position | −32.00 | −82.19 | −203.71 |

Zoom lens unit data

| Unit | First surface | Focal length | Lens structure length | Front principal point position | Rear principal point position |
|---|---|---|---|---|---|
| 1 | 1 | 140.58 | 15.03 | −0.64 | −10.33 |
| 2 | 6 | −34.45 | 8.70 | 4.06 | −1.62 |
| 3 | 11 | 56.61 | 11.70 | 0.96 | −7.09 |
| 4 | 17 | 71.21 | 12.37 | 7.93 | 0.82 |
| 5 | 23 | −81.17 | 3.75 | 1.44 | −0.58 |

Single lens data

| Lens | First surface | Focal length |
|---|---|---|
| 1 | 1 | 226.56 |
| 2 | 3 | −157.84 |
| 3 | 4 | 109.12 |
| 4 | 6 | −26.58 |

-continued

Unit mm

| 5 | 7 | 39.00 |
|---|---|---|
| 6 | 9 | −64.38 |
| 7 | 11 | 64.69 |
| 8 | 14 | 60.08 |
| 9 | 15 | −68.55 |
| 10 | 17 | −62.10 |
| 11 | 19 | 61.87 |
| 12 | 21 | 79.73 |
| 13 | 23 | 87.75 |
| 14 | 24 | −42.30 |

TABLE 1

| | Example 1 | Example 2 | Example 3 | Example 4 | Example 5 | Example 6 |
|---|---|---|---|---|---|---|
| Conditional Expression (1) | 0.73 | 0.70 | 0.73 | 0.80 | 0.80 | 0.79 |
| Conditional Expression (2) | −0.76 | −0.71 | −0.87 | −0.73 | −0.72 | −0.84 |
| Conditional Expression (3) | −0.33 | −0.31 | −0.37 | −0.38 | −0.37 | −0.37 |
| Conditional Expression (4) | −1.05 | −1.00 | −1.11 | −0.94 | −1.00 | −1.13 |
| Conditional Expression (5) | 0.015 | 0.015 | 0.013 | 0.013 | 0.013 | 0.013 |
| Conditional Expression (6) | −2.74 | −2.30 | −2.69 | −2.10 | −1.87 | −1.87 |
| Conditional Expression (7) | −0.69 | −0.69 | −0.66 | −0.85 | −0.80 | −0.70 |
| Conditional Expression (8) | −0.27 | −0.25 | −0.33 | −0.22 | −0.21 | −0.27 |
| Conditional Expression (9) | −0.93 | −0.95 | −0.90 | −0.91 | −0.97 | −0.84 |
| Conditional Expression (10) | 2.15 | 2.17 | 2.06 | 2.30 | 2.42 | 1.95 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132590, filed Jul. 1, 2015, which is hereby incorporated by reference herein in its entirety.

What is claimed is:

1. A zoom lens, comprising, in order from an object side to an image side:
    a first lens unit having a positive refractive power;
    a second lens unit having a negative refractive power;
    a third lens unit having a positive refractive power;
    a fourth lens unit having a positive refractive power; and
    a fifth lens unit having a negative refractive power,
    wherein at a telephoto end as compared to a wide angle end, an interval between the first lens unit and the second lens unit is increased, and an interval between the second lens unit and the third lens unit is decreased,
    wherein an interval between each pair of adjacent lens units is changed during zooming,
    wherein the fifth lens unit is configured to move in an optical axis direction during focusing, and
    wherein the following conditional expressions are satisfied:

$$0.4 < f3/fw < 1.0; \text{ and}$$

$$-1.0 < m5/fw < -0.5,$$

where fw represents a focal length of the zoom lens at the wide angle end, f3 represents a focal length of the third lens unit, and m5 represents a movement amount of the fifth lens unit during zooming from the wide angle end to the telephoto end.

2. A zoom lens according to claim 1, wherein the following conditional expression is satisfied:

$$-0.5<m3/fw<-0.2,$$

where m3 represents a movement amount of the third lens unit during zooming from the wide angle end to the telephoto end.

3. A zoom lens according to claim 1, wherein the following conditional expression is satisfied:

$$-1.2<f5/fw<-0.7,$$

where f5 represents a focal length of the fifth lens unit.

4. A zoom lens according to claim 1, wherein the following conditional expression is satisfied:

$$0.005<L5d/ft<0.017,$$

where L5d represents a thickness of the fifth lens unit on an optical axis, and ft represents a focal length of the zoom lens at the telephoto end.

5. A zoom lens according to claim 1, wherein the following conditional expression is satisfied:

$$-2.9<(R5i-R5o)/(R5i+R5o)<-1.6,$$

where R5o represents a curvature radius of a lens surface closest to the object side of the fifth lens unit, and R5i represents a curvature radius of a lens surface closest to the image side of the fifth lens unit.

6. A zoom lens according to claim 1, wherein the following conditional expression is satisfied:

$$-1.0<f3/f5<-0.6,$$

where f5 represents a focal length of the fifth lens unit.

7. A zoom lens according to claim 1, wherein the following conditional expression is satisfied:

$$-0.50<(m4-m3)/fw<-0.10,$$

where m3 and m4 represent movement amounts of the third lens unit and the fourth lens unit during zooming from the wide angle end to the telephoto end, respectively.

8. A zoom lens according to claim 1, wherein the following conditional expression is satisfied:

$$-1.2<m1/fw<-0.7,$$

where m1 represents a movement amount of the first lens unit during zooming from the wide angle end to the telephoto end.

9. A zoom lens according to claim 1, wherein the following conditional expression is satisfied:

$$1.6<f1/fw<3.0,$$

where f1 represents a focal length of the first lens unit.

10. A zoom lens according to claim 1, wherein the fifth lens unit consists of two lenses.

11. A zoom lens according to claim 10, wherein the two lenses included in the fifth lens unit are cemented.

12. A zoom lens according to claim 1, wherein the fifth lens unit is configured to move toward the image side during focusing from an object at infinity to a close distance object.

13. A zoom lens according to claim 1, wherein all of the first lens unit, the third lens unit, the fourth lens unit, and the fifth lens unit are configured to move toward the object side during zooming from the wide angle end to the telephoto end.

14. A zoom lens according to claim 1, wherein all or a part of the second lens unit is configured to move in a direction having a component in a direction perpendicular to an optical axis to move an image forming position.

15. A zoom lens according to claim 1, further comprising a sixth lens unit having a negative refractive power, which is configured not to move during zooming, on the image side of the fifth lens unit.

16. An image pickup apparatus, comprising:
a zoom lens; and
an image pickup element configured to receive an image formed by the zoom lens,
the zoom lens comprising, in order from an object side to an image side:
a first lens unit having a positive refractive power;
a second lens unit having a negative refractive power;
a third lens unit having a positive refractive power;
a fourth lens unit having a positive refractive power; and
a fifth lens unit having a negative refractive power,
wherein at a telephoto end as compared to a wide angle end, an interval between the first lens unit and the second lens unit is increased, and an interval between the second lens unit and the third lens unit is decreased,
wherein an interval between each pair of adjacent lens units is changed during zooming,
wherein the fifth lens unit is configured to move in an optical axis direction during focusing, and
wherein the following conditional expressions are satisfied:

$$0.4<f3/fw<1.0; \text{ and}$$

$$-1.0<m5/fw<-0.5,$$

where fw represents a focal length of the zoom lens at the wide angle end, f3 represents a focal length of the third lens unit, and m5 represents a movement amount of the fifth lens unit during zooming from the wide angle end to the telephoto end.

* * * * *